United States Patent [19]

Solomon et al.

[11] 4,147,839

[45] Apr. 3, 1979

[54] ELECTROCHEMICAL CELL WITH STIRRED SLURRY

[75] Inventors: Frank Solomon, Great Neck, N.Y.; Charles Grun, Matawan, N.J.

[73] Assignee: Diamond Shamrock Corporation, Cleveland, Ohio

[21] Appl. No.: 858,877

[22] Filed: Dec. 8, 1977

Related U.S. Application Data

[63] Continuation-in-part of Ser. No. 707,462, Jul. 21, 1976, abandoned.

[51] Int. Cl.² .................................... H01M 12/06
[52] U.S. Cl. .................................... 429/15; 429/27; 429/67; 429/70
[58] Field of Search ................ 429/15, 27, 67, 70, 429/51, 68, 69

[56] References Cited

U.S. PATENT DOCUMENTS

| | | | |
|---|---|---|---|
| 3,414,437 | 12/1968 | Doundoulakir | 429/70 |
| 3,525,643 | 8/1970 | Spahrbier et al. | 429/15 |
| 3,592,698 | 7/1971 | Baba | 429/34 |
| 3,758,342 | 9/1973 | Baba | 429/27 |
| 3,847,671 | 11/1974 | Leprula | 429/15 |
| 3,879,225 | 4/1975 | Buckhurst | 429/122 |
| 3,887,400 | 6/1975 | Poniat et al. | 429/15 |
| 3,985,581 | 10/1976 | Stachurski | 429/51 |

Primary Examiner—Anthony Skapars
Attorney, Agent, or Firm—John P. Hazzard

[57] ABSTRACT

In a battery of electrochemical unit cells in which an active metal in powder form is an electrode, high rate reaction at high efficiency is achieved by slurrying the powdered metal in the cell electrolyte. The slurrying is carried out entirely within each cell so that no transfer of electrolyte to and from the cell during discharge is necessary. Such batteries are suitable for powering vehicles. A battery of such cells can be emptied and then refuelled either by pressure or by vacuum; in one embodiment the active metal can be regenerated in each of the cells from the discharge products formed therein.

12 Claims, 10 Drawing Figures

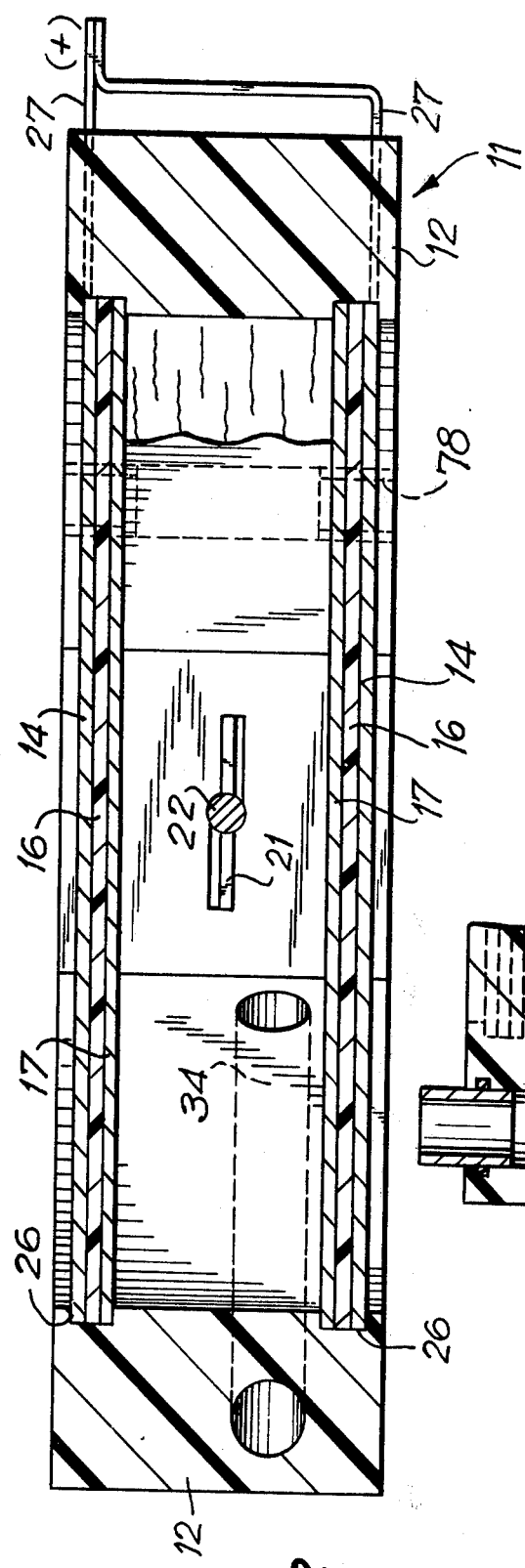
FIG. 2
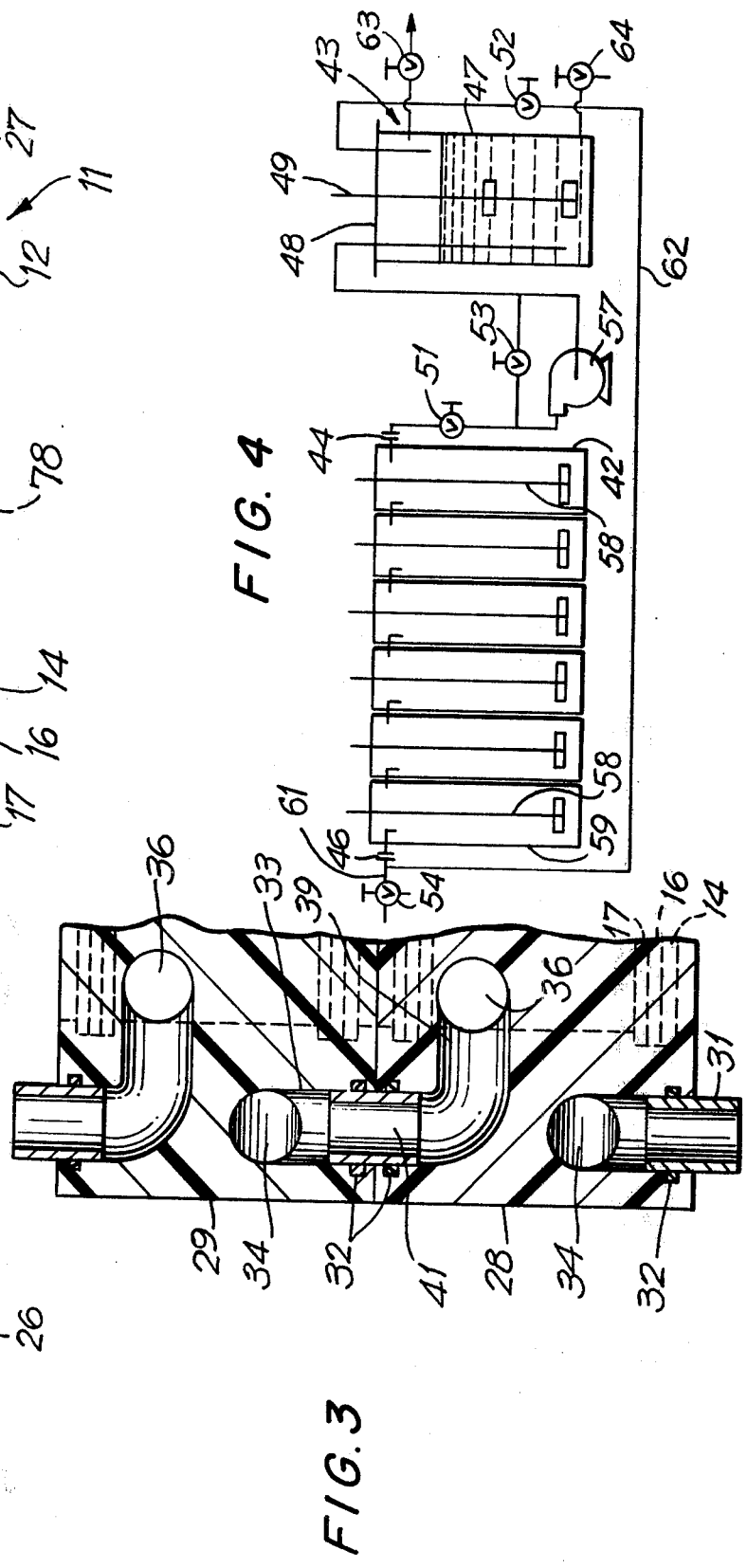
FIG. 4
FIG. 3

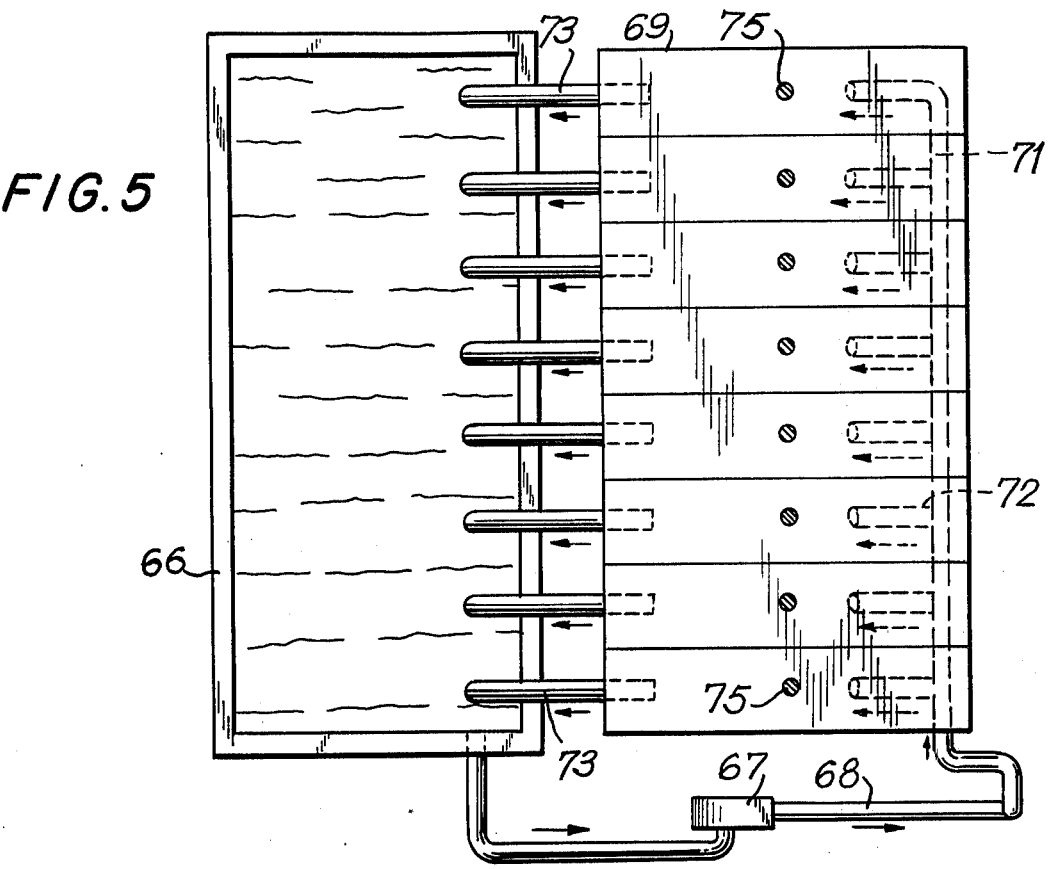
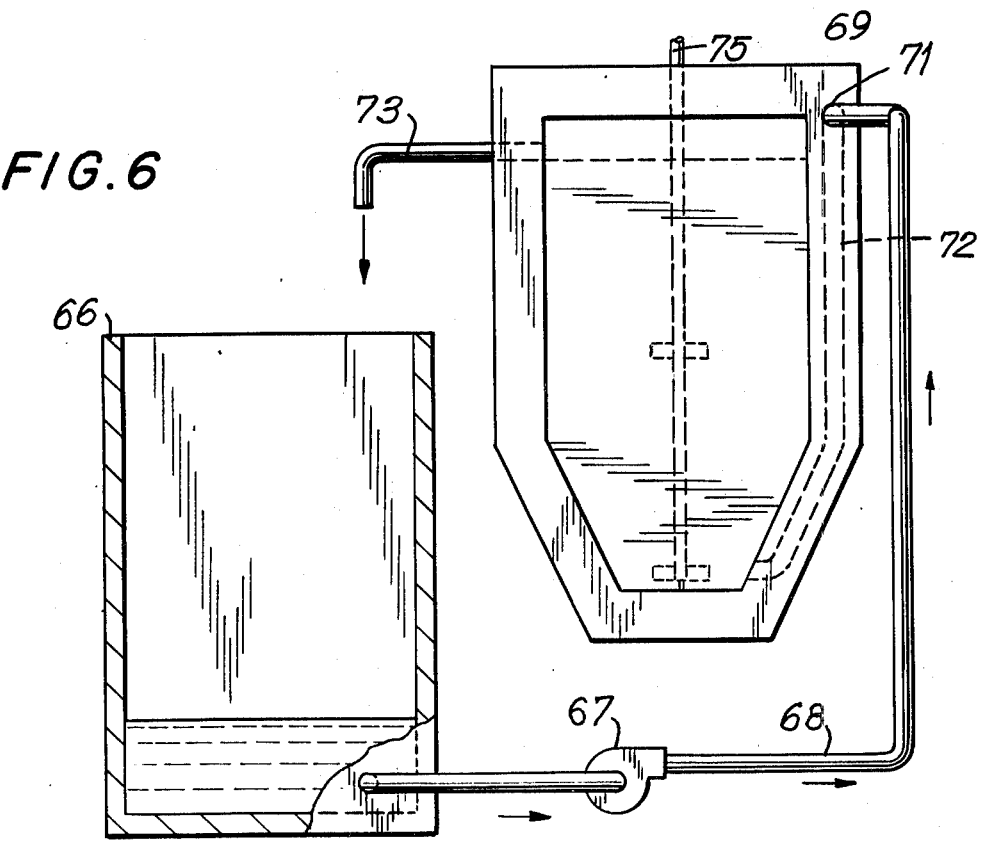

4,147,839

ELECTROCHEMICAL CELL WITH STIRRED SLURRY

CROSS REFERENCE TO RELATED APPLICATION

This application is a Continuation-In-Part application of our co-pending Application Ser. No. 707,462 filed July 21, 1976 entitled ELECTROCHEMICAL CELL WITH STIRRED SLURRY, now abandoned.

BACKGROUND OF THE INVENTION

In the development of electrochemical batteries for powering vehicles, a number of difficult problems have been encountered. Perhaps foremost among these is the ratio of stored energy to weight. The lead-acid battery which is still used in a limited number of applications for powering vehicles generally provides little more than about 11 watt-hours per pound of battery. This energy density is considered inadequate for most vehicular applications. A promising approach to the solution of this problem has been the use of a fuel cell electrode for the positive. Oxygen, i.e., air electrodes which are not unreasonably expensive and which have the desired properties have been developed. Unfortunately, appropriate negative electrodes which can operate on relatively inexpensive fuels are unavailable. Accordingly, effort has been directed toward the development of a negative electrode in the form of a metal which can be used in combination with a gas electrode.

In an aqueous system, zinc has thus far been the metal of choice, although other metals, and, in particular, aluminum may also prove to be suitable. Under suitable conditions the entire discharge product may go into solution as zincate. However, if the electrolyte is not sufficiently alkaline or if access of the electrolyte to the discharge product is inadequate, discharge product may remain on the surface of incompletely discharged metal particles. Such discharge products on the surface of zinc particles can prevent complete utilization of the zinc and can result in caking of the cell contents so that emptying of the cell subsequent to discharge becomes difficult or impossible.

U.S. Pat. No. 3,887,400 teaches the circulation of slurry through the cells in a battery during discharge as a means of obtaining high current densities and complete dissolution of the discharge products during the discharge itself. However, it appears that in order to obtain the necessary uniformity in the slurry within each of the cells, it is necessary to transfer the slurry through the cells at a relatively high rate. If circulation through the outside loop is carried out in such a way that the cells are hydraulically in series, then the pressure drop through the system is large and the energy expenditure is correspondingly large. Conversely, if each cell has its own outside loop, then the mechanical and hydraulic complexity of the system becomes great.

In a battery disclosed in U.S. Pat. No. 3,414,437 both electrodes may consist of slurries of active metal powders suspended in electrolytes, the slurries making contact with metallic stirrer-propellers which also serve as leads to the exterior of the cells. Each cell is divided into a positive and a negative compartment to each of which compartments is connected a slurry-supply tank and a waste products tank by means of which the compartment can be periodically replenished with fresh reactants in the form of slurry.

While the concept of agitating the active powder by means of a propeller can provide for high rate discharge, the use of the propeller as a collector results in a serious limitation on the extent of the area of an electrode of one polarity opposed to an electrode of the opposite polarity as well as an increase in the electrical resistance because of the relatively large distance between the collectors or electrodes of opposite polarity. In addition, even assuming that only one of the active powders need be replenished during discharge, this results in the requirement that each cell have connected thereto two tanks, one for fresh fuel and the other for waste products. Then too, provision must be made for regulating the flow of slurry into and out of each cell, whether the flow is continuous or intermittent.

Said patent also mentions the possibility of an embodiment in which the electrodes may be stationary and the solid materials circulated within the electrolyte by a separate means, but this embodiment is not further described.

U.S. Pat. No. 3,758,342 discloses a metal fuel battery in which the slurry is circulated continuously or intermittently from and to an external slurry tank. Such a device requires circulation at a relatively high rate in order to provide relatively uniform dispersion of the active powder in the electrolyte and introduces the problem of parasitic currents through the hydraulic circuitry. The major portion of the fuel to be consumed during a discharge appears to be held in the slurry tank so that problems associated with external circuitry, as aforenoted, arise.

Attempts have also been made to transport the active powder across the surface of a collector by feeding the powder onto a conveyor belt which is transported across the face of a collector. Such a device is disclosed in U.S. Pat. No. 3,592,698. Another variation is that disclosed in U.S. Pat. No. 3,985,581 which teaches the introduction of an airstream through a multiplicity of orifices into a cylindrical cell in a generally tangential direction so as to impart rotation of the liquid around the axis of the cell. The objective of the invention taught in said patent, however, is somewhat different from that of subject invention in that slurrying of powder is to be avoided. Rather, the intention is to deposit zinc in a form such that it is not dendritic and thus, does not tend to short-circuit the cell.

Another cell which utilizes a slurry electrode is disclosed in U.S. Pat. No. 3,879,225, the slurry electrode being formed by introducing electrolyte at the bottom of the cell and taking the electrolyte out of the cell proximate the top thereof. Such a cell, of course, requires external hydraulic circuitry as well as at least one electrolyte tank per cell.

As is evident, then, a battery is needed where the battery provides the high energy density available with air-zinc and which avoids the problems which arise when circulation of active metal powder and electrolyte at high velocity through the entire battery during discharge is attempted.

SUMMARY OF THE INVENTION

In accordance with the present invention the negative electrode of each of the unit cells in a battery consists of a slurry of active metal powder suspended in electrolyte and a current collector, said negative collector, powder and electrolyte being held in an electrolyte chamber. Each unit cell has a bottom portion which is large enough to accommodate the entire quantity of metal powder to be consumed during a discharge without replenishment from the exterior, the size of said bottom portion being based on the volume of said metal powder when quiescent, that is, in unstirred or unslurried condition. The top portion of said cell is large enough, in combination with said bottom portion, to accommodate the entire quantity of electrolyte necessary for dissolving all of the reaction products produced during a complete discharge.

Slurrying is effected by the use of an agitator, such as a stirrer in each of the cells. Preferably, the electrolyte chamber of each cell is tapered in the bottom portion thereof or otherwise shaped to eliminate the possibility of forming pockets of metal powder in corners at the bottom of each cell, such powder being difficult to slurry by the agitator. However, the shape of the bottom portion must permit the presence of a stirrer in said bottom portion.

A preferred agitator is a pitched impeller on a rotating shaft entering the cell through a gland in the housing of the cell, a propeller generally being the most effective type of impeller. Each shaft may have a plurality of impellers thereon. The cell contents are stirred sufficiently vigorously so that contact is made between powder and essentially the entire area of the negative collector in each cell. The stirring makes discharge at high current density possible by providing contact at extremely high frequency between active metal powder and the entire negative collector, and facilitates dissolution of discharge products in the electrolyte, these effects being obtained at minimal energy expenditure.

Preferably, where zinc is the active metal the negative grid terminates at a height above the bottom of the container so that when the contents of the cell are quiescent, the metal powder does not make contact with the negative grid. This is desirable in order to avoid gassing and self-discharge.

The positive electrode can be any sufficiently electropositive substance, or an oxidant-consuming electrode, but preferably is a gas electrode and still more preferably is an oxygen-air electrode or an oxygen-consuming electrode. However, any oxidizing gas such as chlorine could also be used in combination with the slurried metal powder negative electrode.

The slurrying operation is carried out in such fashion that the contents of a cell remain within that cell throughout discharge, agitation means within each cell being operated simultaneously to obtain the benefits thereof. Naturally, the slurrying is carried out with the minimum expenditure of energy which will provide discharge at the desired rate.

Where the cathode utilizes an oxidizing gas, provision is made for bringing said gaseous oxidant to each of the positive electrodes.

In one embodiment of the invention conduits are provided leading from each cell to the next in sequence to be used in filling and emptying the cells, the conduits being so arranged that electrolyte can be at least partially drained therefrom for the purpose of interrupting electrolyte continuity in said conduits during discharge. A supply tank may be provided both for use in filling the cells, and for use in removing discharge products after a discharge. The conduits connecting successive cells, as well as a conduit leading from the supply tank to the first cell, make it possible to fill all of the cells in series to a desired level by pressurizing the input line to the battery. Alternatively, a vacuum can be drawn at the downstream end of the sequence of cells. A similar procedure can be used for emptying the cells and for flushing them, if desired.

In another embodiment of the invention, each unit cell includes a charger in the electrolyte chamber thereof, said charger comprising opposed positive and negative electrodes of inert metal. Preferably, a wiper is provided together with means for moving the wiper across the surface of the electrode on which metal is to be deposited as the result of the passage of a charging current through said charger. The metal powder deposited on the inert electrode is dislodged and falls to the bottom portion of the electrolyte chamber for re-use. Although hydraulic circuitry may be provided for sequential filling of the cells, such hydraulic circuitry is not strictly necessary and filling and emptying may be accomplished through appropriate openings at the top and bottom of each cell. As is the case with the embodiment described above, the bottom portion and the upper portion of each unit cell are appropriately sized to contain the entire quantity of active metal powder to be consumed during a discharge as well as the requisite quantity of electrolyte without replenishment from the exterior of the cells. Also, stirring means are provided, the preferred stirrer being a pitched impeller, a propeller generally being the most effective type of pitched impeller and mounting of the pitched impeller for upward thrust being generally preferred. A description of the embodiment of the invention including a charger in each cell was filed with the Patent Office in the "Disclosure Documentation Program under the title Storage Battery With Independent Charger System Built Into Each Cell" on Dec. 6, 1976, the Disclosure Document number being 055931 and is incorporated herein by reference.

Accordingly, an object of the present invention is an electrochemical cell and battery utilizing an active metal powder and current collector as the negative electrode wherein said powder is slurried in electrolyte during discharge by agitation means within each cell.

Another object of the present invention is an electrochemical battery in which the cells in the battery can be filled with a slurry of active metal powder in electrolyte by the use of pressure or vacuum to establish a pressure difference between the two ends of a sequence of cells constituting a battery or sub-group in a battery.

A further object of the present invention is an electrochemical cell and battery in which an active metal powder in slurried form is used as a negative electrode and in which the positive electrode is a fuel cell cathode which operates on an oxidizing gas or liquid.

A significant object of the present invention is an electrochemical battery which can be emptied of discharge products, unused active metal powder constituting the negative electrode and electrolyte by the use of pressure or vacuum to establish a pressure difference between the two ends of a sequence of cells constituting a battery or sub-group in a battery.

Still another object of the present invention is a battery of electrochemical cells which can be filled with a slurry of active metal powder in electrolyte wherein the compositions and quantities of slurry in the cells are essentially equal.

An important object of the present invention is a method of operating a cell or battery in which active metal powder constituting the negative electrode is slurried in an electrolyte by agitation means within each cell during discharge.

Yet another object of the present invention is a method of filling and emptying an electrochemical battery by the use of conduits connecting each cell with at least one other cell and the use of a difference in pressure to transport a slurry of active metal powder in electrolyte or discharge products in electrolyte from one end of a sequence of cells to the other end of the sequence of cells.

Yet a further object of the present invention is a battery of electrochemical cells wherein each of said cells includes a separate pair of electrodes for charging said cell by passage of electric current therebetween for deposition of active metal powder to be consumed in a subsequent discharge.

Still another object of the invention is a method of operating a battery of electrochemical cells wherein each of said cells includes a separate pair of electrodes for charging said cell by passage of electric current therebetween for deposition of active metal powder to be consumed in a subsequent discharge.

Still other objects and advantages of the invention will in part be obvious and will in part be apparent from the specification.

The invention accordingly comprises the several steps and the relation of one or more of such steps with respect to each of the others, and to the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a section taken along line 2—2 of FIG. 1;

FIG. 3 is a section taken along line 3—3 of FIG. 1;

FIG. 4 is a diagram of the hydraulic connections for filling and emptying a battery in accordance with the present invention;

FIG. 5 is a top view of a battery arranged for parallel filling of cells;

FIG. 6 is an end view of the battery of FIG. 5;

DESCRIPTION OF THE PREFERRED EMBODIMENTS

Figure 1:
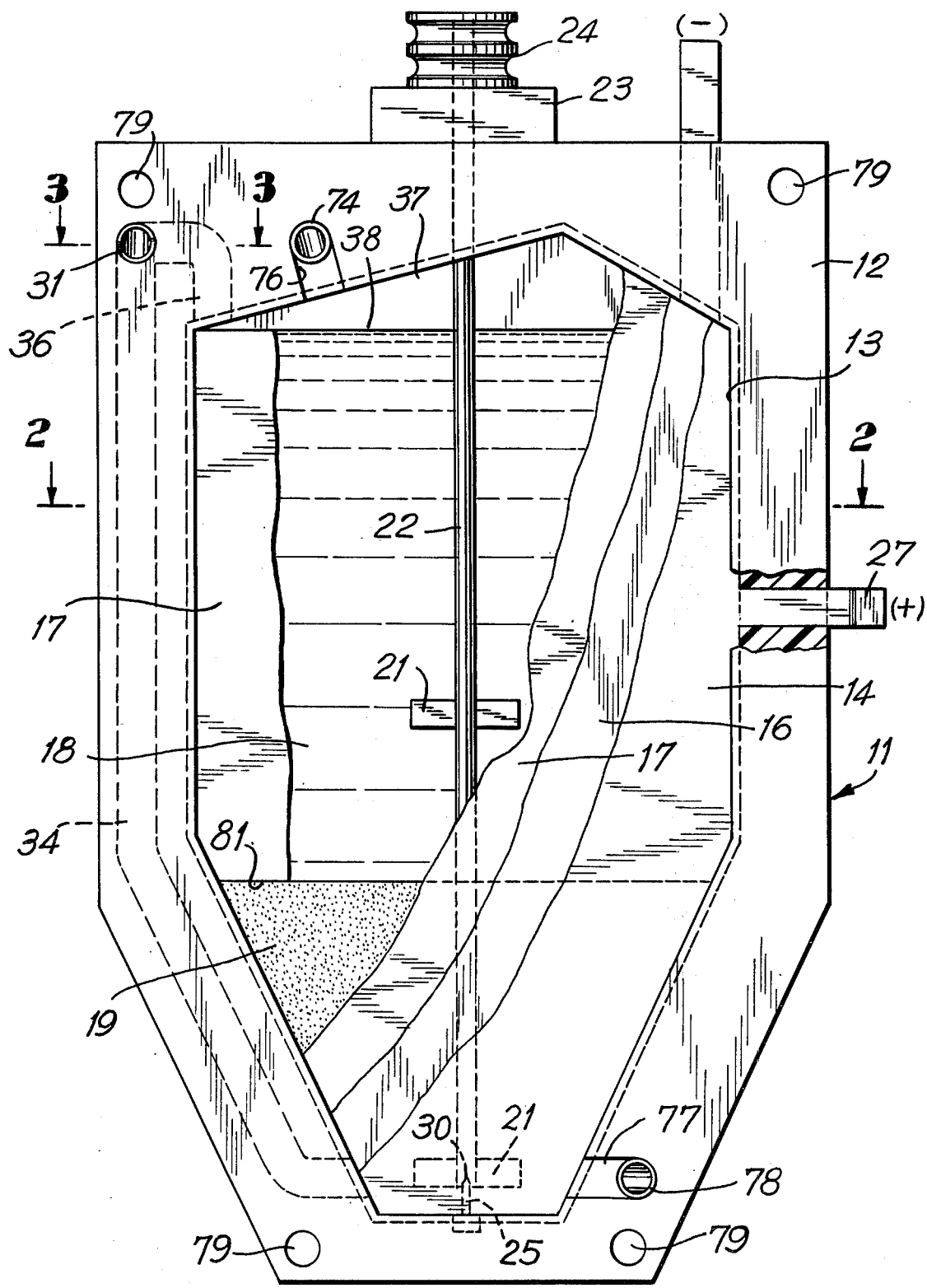
FIG. 1 is an elevational view of a unit cell in accordance with the present invention.

FIG. 1 is an elevational view of a unit cell in accordance with the present invention, said cell being equipped with a stirrer. The cell, generally indicated by the reference numeral 11, has a frame 12 of an insulating material such as polyacrylic resin. Said frame has an opening 13 passing entirely therethrough. The opening 13 at each face of frame 12 is covered with a positive electrode 14, a battery separator 16 and a negative collector 17, separator 16 preferably being contiguous with both positive electrode 14 and negative collector or grid 17. As aforenoted, each face of the frame 12 is covered by such a combination of positive electrode on the outside, a separator and a negative collector. The two sets form a container with an electrolyte chamber 10 for holding electrolyte 18 and active metal powder 19, the cell being shown in quiescent condition.

A principal feature of cell 11 is an agitator, shown in the embodiment of FIG. 1 as a pitched impeller 21 mounted upon a shaft 22 for rotation therewith. Shaft 22 enters cell 11 through gland 23 which prevents transit of air through the frame along the shaft. Conveniently, a double-groove pulley 24 which may be driven by a belt and which can drive a pulley on an adjacent cell by means of a belt (neither of the belts being shown) is firmly attached to shaft 22 for rotating same. Conveniently, a pin 25 mounted in frame 11 fits into a socket 30 at the bottom of shaft 22 to hold the lower end of shaft 22 in place during rotation.

Preferably, impellers 21 have a pitch so related to the direction of rotation of the impellers as to drive active metal powder 19 and electrolyte 18 in an upward direction thereby generating a slurry. Also, propellers have been found to be an especially effective type of pitched impeller. During discharge as well as during filling and emptying, impellers 21 are rotated at a rate sufficient to render the slurry of metal particles 19 in electrolyte 18 essentially constant in composition throughout each unit cell, as well as throughout a battery of such unit cells. A high degree of uniformity in the quantity of active metal powder introduced during filling is extremely important since the capacity of the battery will be limited to that of the capacity of the unit cell containing the smallest quantity of active metal powder.

The use of stirring means which is completely internal to each of the cells, except for powering of same, is highly advantageous with respect to the reduction in complexity such as is involved with external circulation of the electrolyte and suspended solids. Pumps, required for external circulation, are eliminated, as well as the associated external hydraulic circuitry and space-consuming tanks.

The electrode sets, each consisting of a positive, a separator and a negative are conveniently set in grooves 26 in frame 12 as shown in FIG. 2. The way in which positive leads 27 are taken out through frame 12 is also shown in FIG. 2.

A convenient method of providing for circulation of slurry through successive cells in a battery during filling and emptying is shown, taking FIGS. 1 and 3 in combination. Two contiguous cells numbered respectively 28 and 29 are shown in partial section in FIG. 3. Slurry enters through conduit 31 and cell 28. Conduit 31 is sealed into the frame of cell 28 by means of O-ring 32. The slurry travels through passage 33 and then down through essentially vertical passage 34. Preferably, the agitation means is activated so that the slurry remains essentially homogeneous as the cell fills. When the slurry reaches passage 36, air is entrapped in head space 37 to establish a liquid level as indicated at 38. The slurry then traverses passage 36 and passage 39 leaving cell 28 through conduit 41. Cell 29 is then filled exactly the same way with the agitation means in cell 29 also activated. As with cell 28, the slurry proceeds upwardly through passage 36 and on to the next cell (not shown).

FIG. 4 shows the general method of filling a battery or a sub-group of a battery. It is to be recognized that since the battery 42 is considered suitable for use in a vehicle, and since the battery is not to be refuelied while the vehicle is in motion, a stationary refuelling system must be provided. Such a system, as shown in FIG. 4, is indicated generally by the reference numeral 43, the refuelling system being connected to the battery by coupling means 44 and 46 which may be of conventional construction. The refuelling system includes a tank 47, fitted with a sealing cover 48 and agitation means 49. In preparation for filling a battery, electrolyte and active metal powder in an appropriate ratio as will be explained below, are added to the tank. Agitator 49 is put into operation at a rate such that the composition in the tank 47 becomes essentially homogeneous throughout. Valves 51 and 52 are opened, while valves 53 and 54 are closed. Slurry pump 57 and agitators 58 in all of the cells are set into operation. When battery 42 is fully refuelled, slurry leaves last cell 59 in the battery through conduit 61 and returns to tank 47 through conduit 62. If desired, valve 52 can be closed and valve 54 opened, and the filling of the battery can be terminated as soon as slurry emerges from valve 54. However, excess slurry may be recirculated to tank 47 continuously until tests show that the composition is homogeneous and corresponds to that originally placed in the tank. Battery 42 is then uncoupled from filling system 43 so that the vehicle is free to leave.

It should be noted that the battery can be filled by applying vacuum through valve 54 and opening valve 63 so that air pressure on the surface of the slurry in tank 47 will force the slurry through the cells of battery 42. Naturally, a tank (not shown) must be provided between valve 54 and the means for applying suction thereto to avoid entry of the slurry into the vacuum pump.

At the conclusion of filling the unit cells, and after stopping pump 57, valve 54 may be opened to drain therefrom the electrolyte or slurry in that part of vertical passage 34 and passage 35, thereby interrupting the hydraulic circuitry between cells so that no electric current can flow through such circuitry. It will be noted that passage 34 in one unit cell and passage 36 in the adjacent unit cell form two legs of an inverted U connected together by conduits 31 in adjacent cells. This portion of the hydraulic circuitry can also be drained by opening valve 52A while valve 52 is closed or by allowing the contents to drain back into tank 47. For this drainage to occur it is desirable that conduits 35A and 35B lie below the level of conduit 35C. The system of FIG. 4 can also be used for removing the contents of the cells after a discharge, whether the discharge is total or partial. To effect removal of the battery contents, valves 54, 51, 53 and 63 are opened, and valve 63 is connected to a source of vacuum. Valve 52 is closed. Agitators 58 are activated during the removal of the contents of the battery in order to ensure that pockets of powder do not remain at the bottom of any of the cells. When the transfer of the battery contents to tank 47 is complete, valve 64 is opened and the contents of tank 47 can be drained, preferably to a system in which the active metal powder is recovered by reduction of the oxidation products of discharge. If desired, tank 47 can be charged with fresh electrolyte or appropriate cleaning liquid, and the liquid can be circulated through the cells to clean them out thoroughly.

In the embodiment of FIG. 4, the cells are filled in sequence and agitation of the electrolyte-metal powder composition is carried out completely internally to each cell. However, under certain circumstances, parallel filling and emptying of the cells is desirable, the filling and emptying being accompanied by agitation provided by agitation means within each cell. Such parallel filling and emptying may be resorted to in connection with the use of unit cells each containing a charger device for regeneration of active metal powder consumed during discharge. Such an arrangement is shown in FIGS. 5 and 6. The embodiment of FIGS. 5 and 6 includes a tank 66 and a slurry pump 67 for transferring electrolyte and active metal powder through conduit 68 to battery 69. The electrolyte enters a manifold 71 having branch tubes 72, each branch tube entering the corresponding cell proximate the bottom thereof. As with serial or sequential filling, the liquid level in each cell rises until the slurry overflows through conduit 73. Each of the cells is provided with agitator means 75 and these agitator means are operated during discharge of the battery as well as during emptying and filling.

The battery of FIGS. 5 and 6 can be emptied by the use of vacuum, applied so as to draw slurry upward through passage 72. Also, valves (not shown) may be placed in each of overflow lines 73 so that the cells in a battery can be emptied individually.

Refueling batteries in accordance with the invention is effected hydraulically and can be carried out rapidly, whether the cells are filled in series, or are fueled in parallel through a header and branch tubes. Obviously subgroups can be fueled in parallel with each other, individual cells in a sub-group being filled in series.

Figure 7:
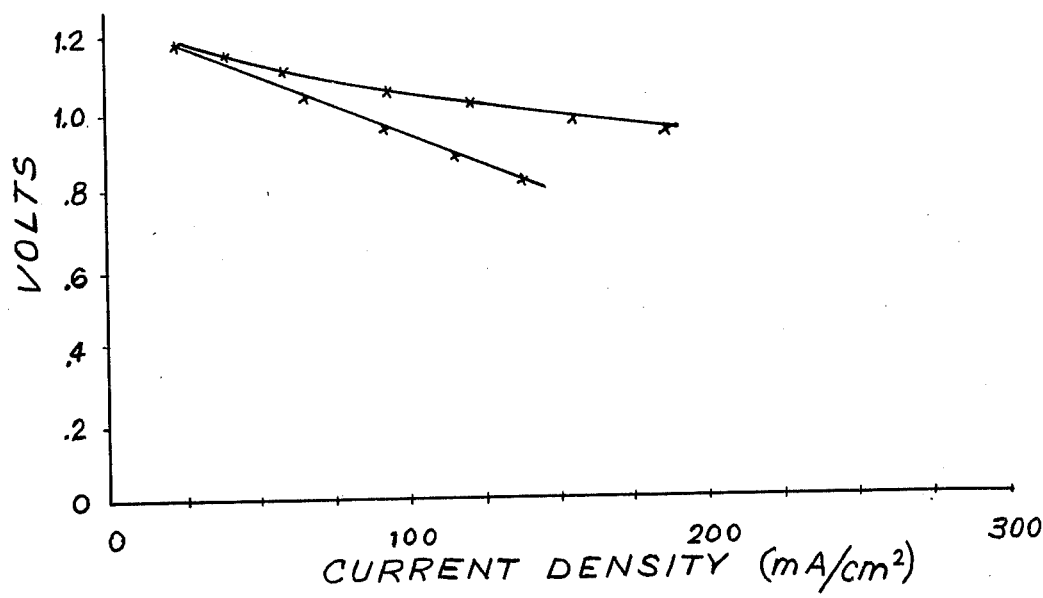
FIG. 7 presents graphs of voltage versus current density for an unstirred cell and for a stirred cell.

The advantages of agitation of the contents of each cell during discharge manifests itself in a variety of ways. FIG. 7, for instance, is a plot of voltage versus current density for a cell, the upper curve showing data obtained on an air-zinc cell with the zinc powder slurried by a stirrer and the lower curve showing the data for a similar cell with the zinc stationary. The stirrer consisted of fourteen propellers mounted on a rotatable shaft. The curves make it evident that for current densities in excess of about 25 mA/cm$^2$, substantially higher voltages are obtained when the cell contents are agitated during discharge. It is particularly significant that current densities as high as 200 mA/cm$^2$ can be achieved with but very little drop in voltage. High current densities are necessary in situations such as in passing another vehicle. Most important, the fact that the drop in voltage at the high current density is low results in less production of internal heat. This is an extremely important advantage since excessive generation of heat internally can cause rapid evaporation of the electrolyte, whether aqueous or non-aqueous.

Figure 8:
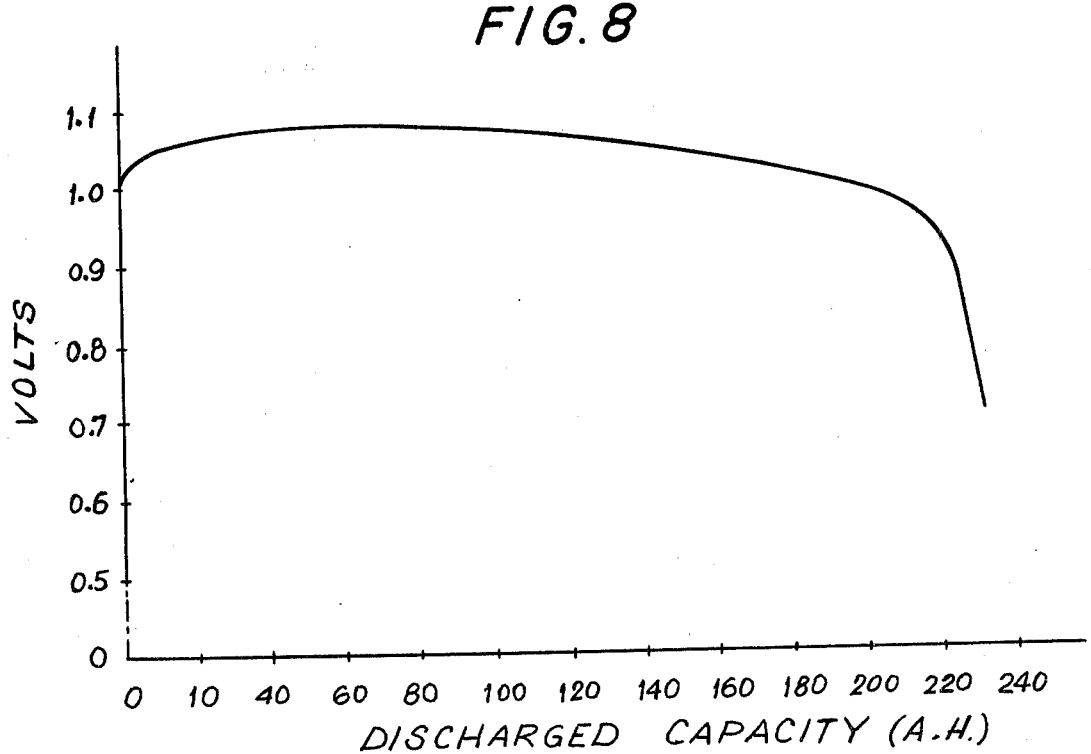
FIG. 8 is a graph of voltage as a function of discharged capacity for a stirred cell.

The voltage data shown in FIG. 7 were obtained in a current density scan, the data being taken when the contents of a cell were about 10% discharged, the current density being held at each level for only about 5 minutes, a period short in comparison with the capacity of the cell. FIG. 8, in contrast, represents the voltage of a cell discharged at 0.6 A/in$^2$ throughout a complete discharge. A current density of 0.6 A/in$^2$ corresponds to 93 mA/cm$^2$.

The cell was of the type shown in FIG. 1, electrode 14 being an air electrode and the active metal being zinc. Air was introduced through aperture 74 and groove 76 to pass across the exterior face of air electrode 14 and exit through groove 77 and aperture 78. Each of apertures 74 and 78 constitutes part of a different manifold, one manifold serving to supply air to the cells and the other serving to exhaust air from which a portion of the oxygen had been removed. In a battery, grooves 76 and 77 each serve two contiguous cells placed face to face. The cells may be held together by means of bolts and nuts (not shown) the bolts passing through bores 79.

The cell on which the data of FIG. 8 were obtained contained 855 cc of electrolyte consisting of 45% KOH containing 54 g of number 88 Kasil per liter, Kasil being a Philadelphia Quartz tradename for potassium silicate containing 1 part by weight of $K_2O$ per 2.20 parts by weight of $SiO_2$. The quantity of zinc was 300 g, the electrode area was 100 in$^2$ and the air flow rate was 300 liter/hr. As can be seen from FIG. 8, the voltage stayed above 1.0 for virtually the entire discharge. The zinc efficiency in terms of ampere-hours obtained/theoretical ampere-hours was 0.95.

A further advantage of agitation of the cell contents during discharge results from the fact that where zinc is used, agitation makes it possible to use a sufficient volume of electrolyte to dissolve all of the discharge products in each cell while still arranging that the zinc reach all parts of the negative collector for discharge. The necessity of the high ratio of electrolyte to zinc derives from the fact that in the discharge of zinc by oxygen, two hydroxyl groups and one water molecule are consumed for each two electrons transferred in the overall cell reaction in which zincate is formed. It should be noted that where the cell contents are unagitated, then the quantity of zinc used must be sufficient to reach all parts of the collector. This would result in a low ratio of electrolyte to zinc and consequent low utilization of the zinc. A similar situation obtains with respect to aluminum as the active metal powder, aluminum being converted to aluminate ion.

The way in which water and hydroxyl groups are consumed during the discharge of an air-zinc cell can be seen from the following equations in which equation (1) shows the half-cell reaction at the oxygen-air electrode, equation (2) shows the half-cell reaction at the negative collector making contact with metallic zinc and equation (3) shows the overall reaction.

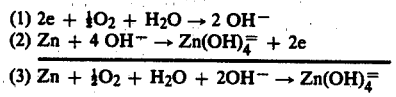

(1) $2e + \frac{1}{2}O_2 + H_2O \rightarrow 2\,OH^-$
(2) $Zn + 4\,OH^- \rightarrow Zn(OH)_4^= + 2e$
_____
(3) $Zn + \frac{1}{2}O_2 + H_2O + 2OH^- \rightarrow Zn(OH)_4^=$ For efficient utilization of all of the zinc present in a cell, the zincate, usually as potassium zincate, formed must be taken into solution. Otherwise, the potassium zincate will be deposited on the exterior of the remaining zinc and access of the electrolyte to the metallic zinc will be prevented. However, as aforenoted, both the hydroxyl ion and the water necessary for forming zincate are consumed during the course of the reaction. Consequently, for complete reaction of the zinc and dissolution of the potassium zincate formed in the process the quantity of electrolyte present in each cell must be such that all of the zinc can be converted to zincate and the resultant zincate can be taken into solution.

The example presented above in connection with FIG. 8 is representative of the quantity of electrolyte needed for discharge of zinc. Where the alkali is essentially 45% KOH approximately 2.85 cc of electrolyte are required for the discharge of 1 gram of zinc. Each cc of electrolyte preferably contains approximately 0.18 grams of potassium silicate where the potassium silicate has the composition of 1 part by weight of $K_2O$ per 2.20 parts by weight of $SiO_2$.

Describing the ratio of electrolyte to zinc metal powder more generally, each mol of Zn requires at least 2 mols of hydroxyl ion for satisfactory discharge, the additional hydroxyl ion being necessary to keep the solution alkaline throughout the discharge and to provide for side reactions such as gassing. The quantity of water present is less critical, it being necessary only that the quantity of water be sufficient to keep the potassium hydroxide, potassium silicate and potassium zincate in solution over the temperature range encountered. The quantity of potassium silicate relative to the quantity of zinc present in each unit cell is also less critical than the quantity of hydroxyl ion, this quantity, again, being dependent upon the temperature range to be encountered, but a satisfactory ratio of potassium silicate to zinc can readily be determined by one skilled in the art.

Where zinc is the active metal powder, the problem of gassing is encountered. Such gassing is particularly rapid where the zinc makes contact with another metal such as iron which could be used as the negative current collector. Accordingly, in such a case it is desirable that the lower edge 81 of negative collector 17 be positioned at a height such that when the zinc powder is unstirred, said lower edge 81 is above the mass of zinc powder 19 resting on the bottom of the cell. As aforenoted, the lower portion of the cell is tapered in order to reduce the intensity with which the agitation means must be activated in order to suspend all of the active metal powder in the electrolyte.

The tapered lower portion can correspond in shape to that shown in FIG. 1; alternatively the bottom of the lower portion can be essentially semi-circular, in which case the propeller 21 may be advantageously placed to one side of the cell. Another suitable shape is the cardioid, that is, two half-circles, side by side, with a cusp at the junction. In this arrangement the stirrer is placed immediately over the cusp.

The degree of agitation necessary during discharge will depend upon the particular active metal powder used, the shape of the cell, the relative densities of the powder and the electrolyte, the viscosity of the electrolyte and, above all, on the current density at which the cell is to be discharged. When the powder is suspended in the electrolyte, contact between metal powder and the negative collector is so frequent that for all practical purposes it is continuous. There will, of necessity, be some decrease with height of the concentration of metal powder in the electrolyte. The greater the agitation rate the more uniform will the concentration be. Obviously, at low rates of agitation, only the lower part of the current collector and therefore, only the lower part of the cell will function. Such a mode of operation will be completely satisfactory where the current to be supplied by the cell is sufficiently low. However, as the demand on the cell is increased, the demand being expressed in terms of current or current density, then the agitation rate should be correspondingly increased. However, even at maximum design currents, the energy required for agitation is small relative to that yielded by the cell, and, in general, is not over about 5% thereof. The agitation rates necessary achieve the desired degree of homogeneity in the suspended solids can be calculated from the equations and data provided in the paper entitled "Selecting Agitator Systems to Suspend Solids in Liquids" published in Chemical Engineering, pages 146–150 of May 24, 1976 by Gates, Morton and Fondy. The energy required to provide the necessary degree of agitation will be a function of the variables listed above. Using the information provided in the aforenoted paper, it is possible to calculate the required energy for the different systems of aqueous electrolytes, nonaqueous electrolytes and metal powders.

It should be noted that although FIGS. 1-3 show a gas electrode as the positive, agitation of the electrolyte to suspend the active metal powder therein is beneficial regardless of the nature of the positive, it only being necessary that reduction at the positive and oxidation at the negative during discharge should give a practical voltage. It is not even necessary that the negative and the positive function with the same electrolyte since constructions are known in which a permeable barrier is used to separate the positive and its corresponding electrolyte from the negative and its corresponding electrolyte.

Further with respect to the nature of the positive electrode, although an oxygen-air electrode is preferred at the present time for its wide applicability, electrodes which function by reaction of oxygen or oxidizing agents at the surface thereof are also known. Accordingly, oxygen-consuming electrodes, and, more broadly, oxidant-consuming electrodes are also to be considered as falling within the scope of the present invention.

In a battery consisting of unit cells of the embodiment shown in FIGS. 1-3, the electrolyte chamber 10 is large enough to hold a sufficient quantity of active metal powder and electrolyte for a full discharge, but it is necessary, nevertheless, to empty the unit cells after each discharge and to refuel them with fresh electrolyte and active metal powder. Obviously, it would be desirable to be able to regenerate the active metal powder and the electrolyte within the cells instead of emptying and filling them after each discharge. Such a procedure has been effective with certain types of batteries such as the lead-acid and the nickel-cadmium batteries. However, long-life, rechargeable batteries where zinc is the negative electrode have not as yet been achieved due principally to the fact that zinc invariably penetrates the separator between the positive and negative electrodes, thereby shorting the cell. In addition, charging against the oxidant electrodes presently available generally causes degradation of the performance of the electrodes.

Figure 10:
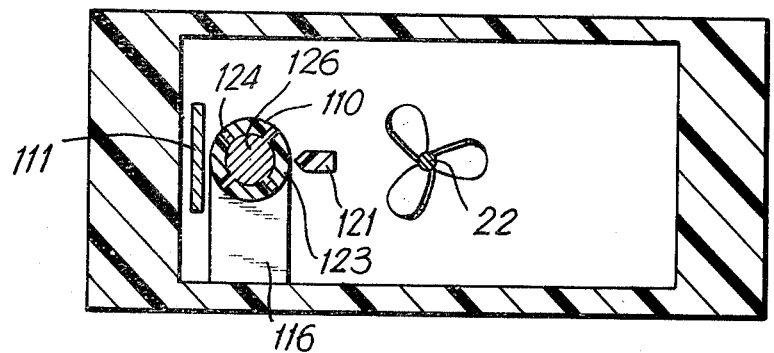
FIG. 10 is a view taken along line 10—10 of FIG. 9.
Figure 9:
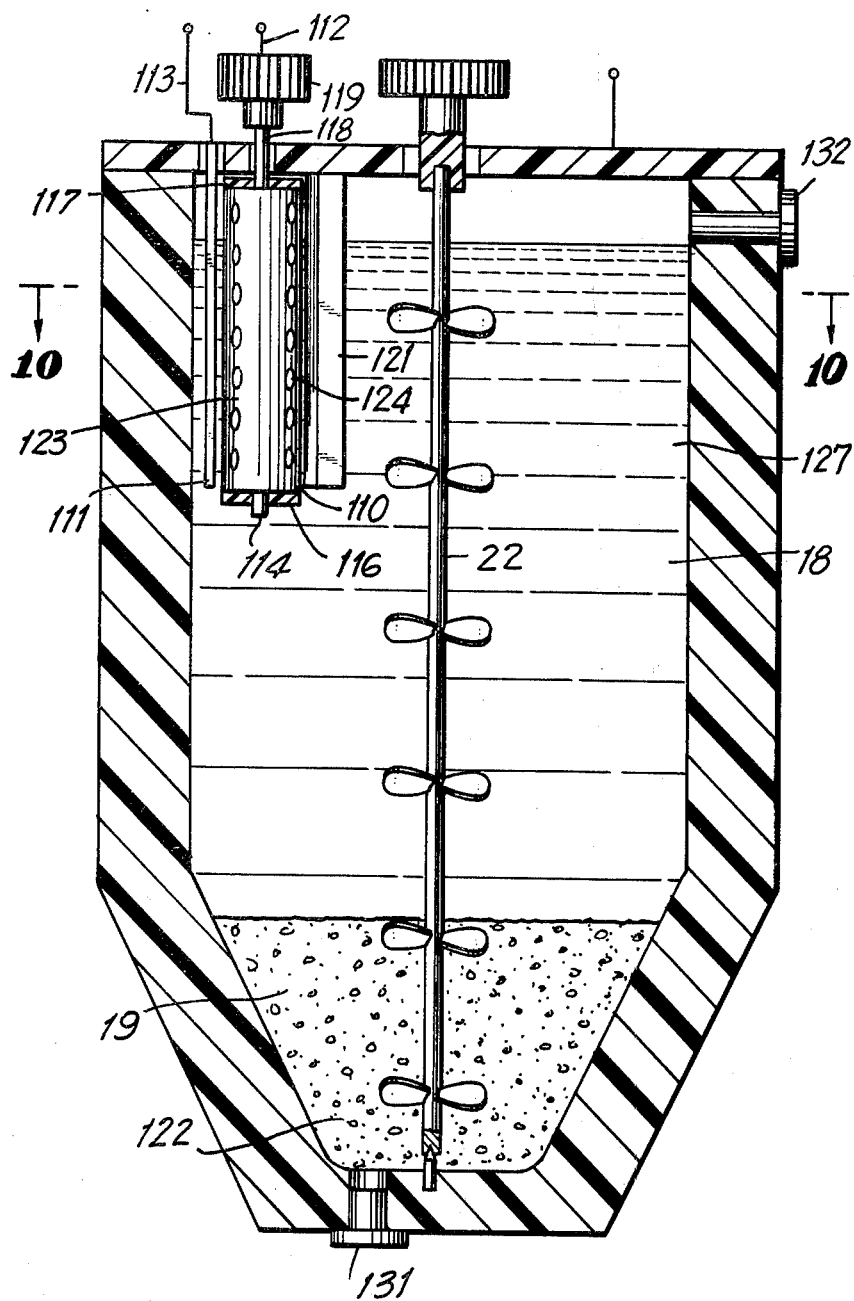
FIG. 9 is an elevational view in section of an embodiment of the invention incorporating charging electrodes.

In conventional cells it has generally been necessary to use for charging purposes the same electrodes used for discharge, due to the limited space available in each cell. However, the cells described herein are sufficiently large in volume to permit the introduction of separate charging electrodes. An embodiment of such a cell is shown in FIGS. 9 and 10, said cell being similar to that of FIGS. 1-3 with respect to a plastic frame having an opening therein for an oxidant electrode, a separator and a negative collector and providing space for electrolyte and active metal powder in quantity sufficient for a full discharge. In addition, the embodiment shown in FIGS. 9 and 10 has therein a first inert electrode 110 and a second inert electrode 111, both of which can be connected to an exterior source of power through leads 112 and 113 respectively for deposition of metal in powder form on first electrode 110, the polarities of said electrodes being selected so that the metal is deposited on inert electrode 110 from electrolyte 18 in contact therewith. The metal is held in solution in electrolyte 18 in ionic form when the unit cell is in discharged or partially discharged condition.

In a preferred form inert electrode 110 is mounted for rotation. Inert electrode 110 may be mounted on a vertical shaft 114 passing through supports 116 and 117.

Vertical shaft 118 may be driven through gear 119 or by a pulley (not shown). Rotating, inert electrode 110 is provided with a wiper 121 which, in the embodiment shown in FIG. 9, is stationary. As the powder is deposited on rotating electrode 110, it is dislodged therefrom by contact with wiper 120 and falls to lower portion 122 of electrolyte chamber 18.

We have found that the powder is more readily dislodged and is of a form particularly suitable for slurrying in subsequent discharge if said powder is deposited at high current density. The current density in question is that at the electrode at which the metal is deposited. In the construction shown in FIGS. 9 and 10, the principal surface of said electrode consists of a continuous insulating region 123 surrounding relatively small islands 124 of inert metal. Conveniently, the core 126 of electrode 110 is also of metal. A suitable metal for the deposition of zinc is magnesium, nickel and iron also being suitable.

With the incorporation of the inert charging electrodes 110 and 111 in upper portion 127 of electrolyte container 18, the cell and the battery consisting of such unit cells becomes a true secondary battery. Such a battery has a long life which shows no more than a slight deterioration in performance after prolonged use. In addition, the battery provides the option of refilling should such an action be desirable. Emptying and refilling can be carried out by the use of the hydraulic circuitry shown in connection with the embodiments of FIGS. 1-3. However, since frequent emptying and filling is not a necessary concomitant of the embodiment of FIGS. 9 and 10, the hydraulic circuitry necessary for serial filling may be omitted, thereby simplifying the construction of the battery. Nevertheless, initial filling is required and occasional emptying and filling may be desirable. For such occasional filling, openings 131 and 132 proximate the bottom and top, respectively, of the cell are provided. These openings, normally, are stoppered or otherwise sealed. The stirrer 22 is useful during the charge operation as well as during discharge, the reason being that circulation of the electrolyte at the faces of the electrodes decreases polarization, so that it is possible to deposit the metal at higher rate and at lower voltage than would be the case if the solution were unstirred. Decreasing the polarization also minimizes the production of gas during the charge operation.

In general, it is necessary to disconnect the unit cells from each other so that they are no longer series-connected during the charging step. More specifically, the oxident electrode of one cell should be disconnected from the negative collector of the next cell. Failing such disconnection, zinc will plate out either on each oxidant electrode or on each negative collector and gas will evolve at the other electrode or collector.

It will thus be seen that the objects set forth above, among those made apparent from the preceding description, are efficiently attained and, since certain changes may be made in carrying out the above method, and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. An intermittently, hydraulically refuelable battery system comprising a plurality of substantially vertical cell units, each said cell unit containing positive gas electrodes in working relationship with a negative, fluidized bed electrode located in an electrolyte chamber;

said electrolyte chamber being substantially vertically arranged and consisting of an upper and lower portion and having therein electrolyte and active metal powder;

said upper portion consisting of two spaced apart, substantially parallel sidewalls, at least one of said sidewalls made up of an outer battery separator and a substantially contiguous inner negative collector, the remaining portions of said electrolyte chamber along with said sidewalls form a substantially, completely enclosed electrolyte chamber;

said chamber having means to charge fresh electrolyte and active metal powder as well as means to discharge spent electrolyte and spent metal powder when said battery system is dormant;

stirring means located within said electrolyte chamber to maintain said active metal powder fluidized so that said metal powder randomly contacts said negative collector during discharge of said battery system becoming part of the electrode, said active metal powder filling only the lower portion of the electrolyte chamber when said battery is fully charged and said metal powder is not fluidized and the total volume of the electrolyte chamber is such to contain a sufficient amount of electrolyte to dissolve all of the soluble reaction products formed during discharge of the battery.

2. An intermittently, hydraulically refuelable battery system as defined in claim 1 wherein the means to charge fresh electrolyte and discharge spent electrolyte comprises hydraulic circuitry connecting said unit cells for filling and emptying same of electrolyte, active metal powder and reaction products, said hydraulic circuitry including isolation means for prevention of electric current flow through said hydraulic circuitry during operation of said battery.

3. An intermittently, hydraulically refuelable battery system as defined in claim 2 wherein said isolation means is generally in the form of two essentially upright legs connected together at the upper portions thereof, said islation means providing for flow of electrolyte and active metal powder to and from each said cell unit during filling and emptying and for breaking the electrolyte connection to the exterior of each of said cells units by drainage of electrolyte from said isolation means at the conclusion of filling.

4. An intermittently hydraulically refuelable battery system as stated in claim 1 wherein said stirring means includes an essentially vertical shaft mounted for rotation within said electrolyte chamber and disposed at least partially within said lower portion of said chamber and having at least one pitched propeller blade mounted on said shaft within said lower portion for rotation with said shaft to create an upward thrust.

5. An intermittently, hydraulically refuelable battery system as defined in claim 1 wherein the electrolyte consists essentially of about 45 percent KOH containing about 54 grams of potassium silicate per liter where the ratio of $K_2O$ to $SiO_2$ is about 1:2.20 by weight, the active metal ingredient is zinc powder and the ratio of electrolyte to active metal is about 2.85cc per gram of zinc metal powder in said battery system.

6. An intermittently, hydraulically refuelable battery system as claimed in claim 1, wherein said electrolyte chamber also contains a separate electrolytic system for regenerating active metal powder from the electrolyte while said battery is not being discharged; said recharging apparatus consisting of an inert anode electrically insulated from all other portions of the apparatus, said inert anode being operably arranged with an inert rotatable cathode and means for supplying current to said inert anode and inert rotatable cathode; a wiper blade means in operable relationship to said inert cathode to remove active metal powder buildup on said cathode during recharging and rotation of said inert rotatable cathode.

7. An intermittently, hydraulically refuelable battery system consisting of a plurality of oxygen consuming anodes each interacting with a consumable active metal suspension cathode through an intermediate separator to generate electric power; each cathode consisting of a negative collector grid defining the active area of the cathode in contact with a catholyte compartment containing a suspension of active metal powder which randomly contacts said collector grid during discharge of said battery system; said catholyte compartment consisting of a main, non-conductive frame-like body member defining the bottom and sidewalls of a substantially vertically arranged compartment; openings at opposite main sidewalls in the upper portion of said chamber; negative collector grids in each said opening to complete the catholyte impermeable catholyte compartment; stirring means located within said catholyte compartment to maintain said active metal powder in suspension in said catholyte during discharge of said battery system; the volume of the catholyte chamber below the negative collector grid being sufficient to accommodate all active metal powder when the system is fully charged and the stirring means is inactive while the volume of catholyte is sufficient in each cell to dissolve substantially all of the soluble reaction products formed during discharge of the battery; means for filling and exhausting catholyte and active metal powder associated with each such cathode compartment; battery separators contiguous to each said negative collector grid and also contiguous to associated oxygen consuming anodes, and means for supplying oxygen to said anodes.

8. An intermittently, hydraulically refuelable battery system as defined in claim 7 wherein the means for filling and exhausting catholyte and active metal powder associated with each such cathode department comprises hydraulic circuitry connecting said unit cells for filling and emptying same of catholyte, active metal powder and reaction products, said hydraulic circuitry including isolation means for prevention of electric current flow through said hydraulic circuitry during operation of said battery.

9. An intermittently, hydraulically refuelable battery system as defined in claim 8 wherein said isolation means is generally in the form of two essentially upright legs connected together at the upper portions thereof, said isolation means providing for flow of catholyte and active metal powder to and from each said cell unit during filling and emptying and for breaking the catholyte connection to the exterior of each of said cell units by drainage of catholyte from said isolation means at the conclusion of filling.

10. An intermittently, hydraulically refuelable battery system as defined in claim 7 wherein said stirring means includes an essentially vertical shaft mounted for rotation within said catholyte chamber and disposed at least partially within said lower portion of said chamber and having at least one pitched propeller blade mounted on said shaft within said lower portion for rotation with said shaft to create an upward thrust.

11. An intermittently, hydraulically refuelable battery system as defined in claim 7 wherein the catholyte consists essentially of about 45 percent KOH containing about 54 grams of potassium silicate per liter where the ratio of $K_2O$ to $SiO_2$ is about 1:2.20 by weight, the active metal ingredient is zinc powder and the ratio of electrolyte to active metal is about 2.85cc per gram of zinc metal powder in said battery system.

12. An intermittently, hydraulically refuelable battery system as claimed in claim 7, wherein said catholyte chamber also contains a separate electrolytic system for regenerating active metal powder from the catholyte while said battery is not being discharged; said recharging apparatus consisting of an inert anode electrically insulated from all other portions of the apparatus, said inert anode being operably arranged with an inert rotatable cathode and means for supplying current to said inert anode and inert rotatable cathode; a wiper blade means in operable relationship to said inert cathode to remove active metal powder buildup on said cathode during recharging and rotation of said inert rotatable cathode.

* * * * *